United States Patent [19]
Yamamoto et al.

[11] Patent Number: 5,572,513
[45] Date of Patent: Nov. 5, 1996

[54] PATH PROTECTION SWITCHING DEVICE

[75] Inventors: Kanta Yamamoto; Hideaki Mochizuki, both of Kawasaki, Japan

[73] Assignee: Fujitsu Limited, Kanagawa, Japan

[21] Appl. No.: 343,707

[22] Filed: Nov. 22, 1994

[30] Foreign Application Priority Data

Mar. 18, 1994 [JP] Japan .................................. 6-048082

[51] Int. Cl.⁶ ................................. H04J 3/08; H04J 3/14
[52] U.S. Cl. ............................. 370/16; 370/55; 370/112
[58] Field of Search ............................ 370/13, 14, 15, 370/16, 16.1, 53, 54, 55, 58.1, 66, 68.1, 85.12, 85.15, 100.1, 105.3, 110.1, 112, 84; 340/825.01, 825.03, 825.05, 825.06, 825.16, 825.17, 825.36, 825.37, 826; 395/181, 182.01, 182.02

[56] References Cited

U.S. PATENT DOCUMENTS

| | | | |
|---|---|---|---|
| 4,434,485 | 2/1984 | Huffman et al. | 370/55 |
| 4,468,767 | 8/1984 | Warren et al. | 370/55 |
| 4,506,357 | 3/1985 | Nakayashiki et al. | 370/16 |
| 4,835,763 | 5/1989 | Lau | 370/16 |
| 4,964,095 | 10/1990 | Tyrrell et al. | 370/16 |
| 5,018,135 | 5/1991 | Ashi et al. | 370/55 |
| 5,159,595 | 10/1992 | Flanagan et al. | 370/85.15 |
| 5,265,096 | 11/1993 | Parruck | 370/110.1 |
| 5,278,824 | 1/1994 | Kremer | 370/15 |
| 5,282,200 | 1/1994 | Dempsey et al. | 370/85.12 |
| 5,287,513 | 2/1994 | Ferguson | 370/16.1 |
| 5,307,353 | 4/1994 | Yamashita et al. | 371/11.2 |
| 5,311,504 | 5/1994 | Takatsu | 370/16 |
| 5,369,653 | 11/1994 | Kuroda | 370/55 |

FOREIGN PATENT DOCUMENTS

| | | |
|---|---|---|
| 0503474 | 9/1992 | European Pat. Off. . |
| 2253973 | 9/1992 | United Kingdom . |

*Primary Examiner*—Alpus H. Hsu

[57] ABSTRACT

A path protection switching device is provided for a SONET type transmitter-receiver for transmitting and receiving synchronous byte multiplex signals, wherein the scale of circuitry such as a path switch, alarm detecting sections and the like can be reduced. A path switch selects one of channel signals input thereto at identical timing, from time-division multiplex signals output from first and second TSAs while the multiplex signals remain multiplexed. In order for one of the channel signals to be selected while the signals remain multiplexed, the channel signals must be in phase; therefore, phase adjusting sections are provided to cope with the situation where the channel signals are out of phase. Further, to enable the path protection switching device to operate on time-division multiplex signals in which channel signals of difference sizes are multiplexed, VT size detecting sections each detect the size of individual channel signals forming the multiplex signal, and supply the detected signal size to the path switch.

9 Claims, 14 Drawing Sheets

CURRENT SIDE

RESERVE SIDE

MASTER TIMING PULSE

MASTER CLOCK PULSE

CURRENT SIDE

RESERVE SIDE

PATH PROTECTION SWITCHING DEVICE

BACKGROUND OF THE INVENTION

1. Field of the Invention

The present invention relates to a path protection switching device in a transmitter-receiver for transmitting and receiving synchronous byte multiplex signals, and more particularly, to a path protection switching device for a transmitter-receiver employing PPSR (Path Protection Switched Ring) of SONET (Synchronous Optical NETwork) type.

2. Description of the Related Art

PPSR is a method for selecting a path (channel) of excellent state from current and reserve lines of a ring network to ensure line quality, and is presently used as a basic technique for new synchronous network transmission. As a signal to be transmitted, a multiplex signal obtained by subjecting a basic signal (STS-12, STS-3, STS-1, VT1.5, VT2, VT3, VT6, etc.) to time-division multiplexing is used. According to PPSR, the current or reserve line is selected for each of the basic signals from which the multiplex signal is derived.

FIG. 13 illustrates a SONET type ring network. As illustrated, ADM (Add Drop Multiplexer) transmitters-receivers 101 to 104 are connected in a ring via a two-way optical transmission path, and synchronous byte multiplex signals are transferred among the transmitters-receivers. The transmitters-receivers 101 to 104 have the same internal arrangement; therefore, the transmitter-receiver 101 alone will be explained below.

The transmitter-receiver 101 comprises line terminators (LTE) 101a and 101b, a path switch 101c, a gate section 101d, and other elements. The line terminator 101a extracts only those signals (drop signals) which are directed to low-order transmit-receive units (not shown) belonging to the transmitter-receiver 101, from among the multiplex signals received from the transmitter-receiver 102, and supplies the extracted signals to the path switch 101c, while the remaining signals (through signals) are transferred to the line terminator 101b. The line terminator 101b derives a multiplex signal by adding signals (add signals) supplied thereto from the low-order transmit-receive units via the gate section 101d, to the through signals supplied from the line terminator 101a, and transmits the multiplex signal to the transmitter-receiver 104. A process similar to the above is executed by the line terminators 101b and 101a with respect to multiplex signals transmitted from the transmitter-receiver 104.

The path switch 101c serves principally to select a signal of higher line quality from the drop signals supplied from the line terminators 101a and 101b, and to supply the selected signal to the low-order transmit-receive units. These drop signals are identical to each other but are transmitted to the transmitter-receiver 101 via different routes.

The internal arrangement of the transmitter-receiver will be now explained.

FIG. 14 is a block diagram showing the internal arrangement of a conventional transmitter-receiver utilizing PPSR. The figure illustrates a drop signal processing section alone.

O/E modules 105 and 106 each convert an optical signal supplied thereto to an electrical signal, and DMUXs 107 and 108 each separate the multiplex signal into n-channel signals. TSA (Time Slot Assignment) elements 109 and 110 individually perform cross connection. The TSA 109 distributes drop signals of the individual channels to n path switches 111–112, as well as to n alarm detecting sections 113–114. Similarly, the TSA 110 distributes drop signals of the individual channels to the n path switches 111–112, as well as to n alarm detecting sections 115–116.

The alarm detecting sections 113–114 each extract alarm information contained in the drop signal supplied thereto, and supplies the extracted information to the corresponding one of the path switches 111–112 as a control signal. Similarly, the alarm detecting sections 115–116 each extract alarm information contained in the drop signal supplied thereto, and supplies the extracted information to the corresponding one of the path switches 111–112 as a control signal. Based on the alarm control signals, each of the path switches 111–112 selects a drop signal of higher line quality from the two drop signals supplied thereto, and supplies the selected signal to the low-order transmit-receive unit of the corresponding channel. For example, the path switch 111 associated with channel 1 selects a drop signal of higher line quality from the two drop signals supplied from the TSAs 109 and 110, based on the control signals supplied from the alarm detecting sections 113 and 115, and supplies the selected signal to the low-order transmit-receive unit associated with channel 1.

The conventional transmitter-receiver described above requires n path switches 111–112, n alarm detecting sections 113–114, and n alarm detecting sections 115–116, corresponding in number to the n channels of the low-order transmit-receive units.

Thus, in the conventional transmitter-receiver, if the number of channels of the low-order transmit-receive units is increased, the scale of circuitry of the transmitter-receiver inevitably enlarges with increase in the number of channels, entailing corresponding increase in the cost of products, power consumption, capacity of the devices and the like.

Further, in cases where extra data need be added to the contents of alarm detection due to a change of the PPSR specifications, for example, the scale of the circuitry must be enlarged corresponding to the number of the channels on each such occasion.

SUMMARY OF THE INVENTION

An object of the present invention is to provide a path protection switching device which permits the scale of circuitry, such as path switches, alarm detecting sections and the like, to be reduced.

To achieve the above object, there is provided a path protection switching device for a transmitter-receiver for transmitting and receiving a synchronous byte multiplex signal. The path protection switching device comprises first receiving means for extracting only channel signals directed to a plurality of channels belonging to a transmitter-receiver associated therewith, from multiplex signals supplied thereto via one path, and subjecting the extracted channel signals to time-division multiplexing to obtain a time-division multiplex signal, second receiving means for extracting only channel signals directed to the channels from multiplex signals supplied thereto via another path, and subjecting the extracted channel signals to time-division multiplexing to obtain a time-division multiplex signal, and a path switch for selecting one of the channel signals supplied thereto at identical timing, from the time-division multiplex signals output from the first and second receiving means while the time-division multiplex signals remain multiplexed.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment according to the present invention will be outlined first.

Figure 1:
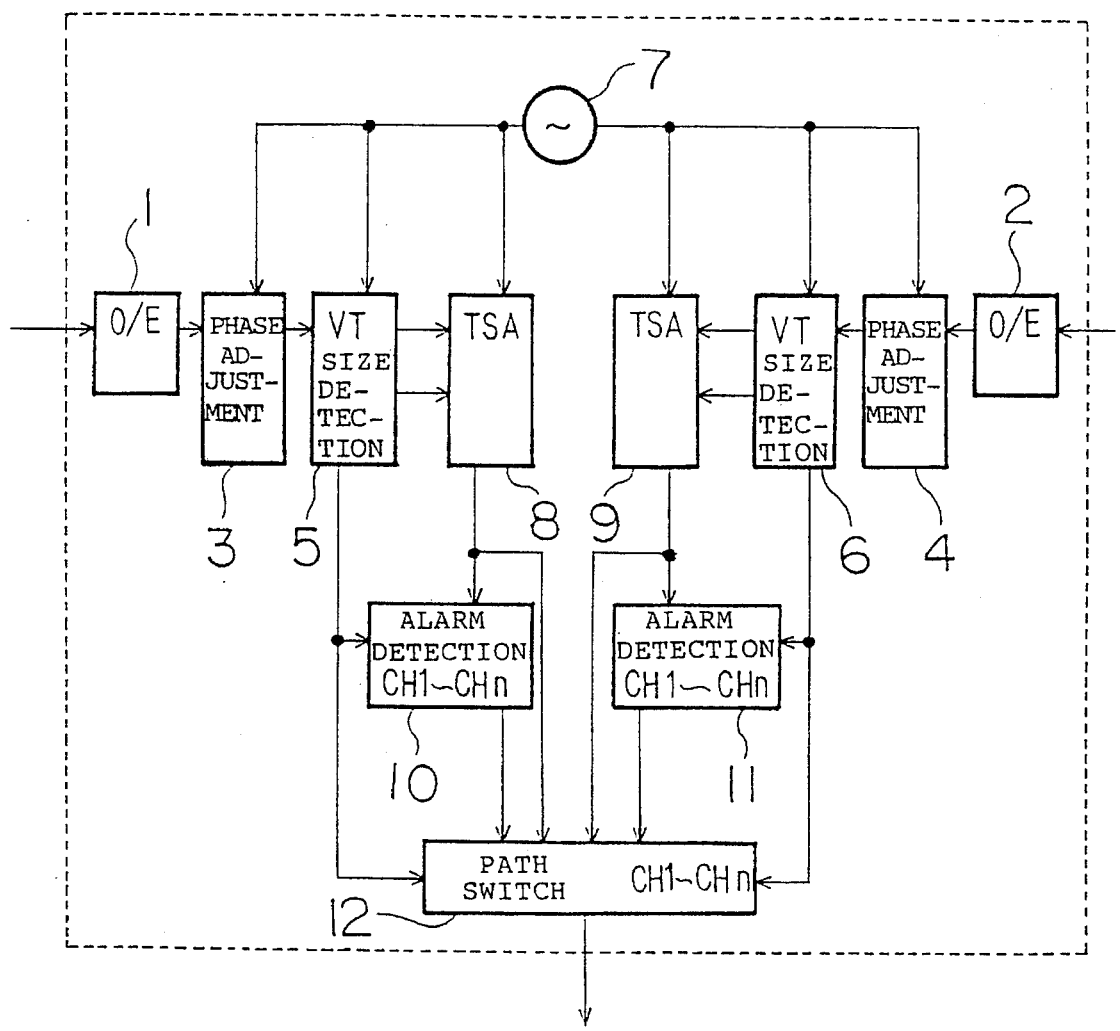
FIG. 1 is a block diagram schematically showing a transmitter-receiver according to the present invention.

As shown in FIG. 1, a path protection switching device comprises first receiving means (8) for extracting only channel signals directed to a plurality of channels belonging to a transmitter-receiver associated therewith, from multiplex signals supplied thereto via one path, and subjecting the extracted channel signals to time-division multiplexing to obtain a time-division multiplex signal, second receiving means (9) for extracting only channel signals directed to the channels from multiplex signals supplied thereto via another path, and subjecting the extracted channel signals to time-division multiplexing to obtain a time-division multiplex signal, and a path switch 12 for selecting one of the channel signals supplied thereto at identical timing, from the time-division multiplex signal output from the first receiving means (8) and the time-division multiplex signal output from the second receiving means (9) while the time-division multiplex signals remain multiplexed.

The path protection switching device further comprises phase matching means (3, 4) for causing the multiplex signals input respectively via the two paths to be in phase by means of a master clock 7.

Further, the path protection switching device comprises signal size detecting means (5, 6) for detecting the signal size of each of the channel signals forming the multiplex signal input via each of the paths, based on information contained in the multiplex signal, and supplying the detected signal size to the path switch 12. Based on the input signal sizes, the path switch 12 selects one of the channel signals supplied thereto at identical timing, from the time-division multiplex signals in which channel signals of different sizes are multiplexed.

Furthermore, the path protection switching device comprises first alarm detecting means (10) for detecting alarm information contained in the individual channel signals forming the time-division multiplex signal from the first receiving means (8) according to time-division control, and supplying the detected alarm information to the path switch 12, and second alarm detecting means (11) for detecting alarm information contained in the individual channel signals forming the time-division multiplex signal from the second receiving means (9) according to time-division control, and supplying the detected alarm information to the path switch 12.

The path protection switching device which includes signal size detecting means (5, 6) for detecting the signal size of each of the channel signals forming the multiplex signal input via each of the paths, based on information contained in the multiplex signal, also supplies the detected signal size to a corresponding one of first and second alarm detecting means (10, 11). Based on the input signal sizes, each of the first and second alarm detecting means (10, 11) detects alarm information contained in the time-division multiplex signal in which channel signals of different sizes are multiplexed, according to time-division control.

With the arrangement described above, the path switch 12 selects one of the channel signals supplied thereto at identical timing, from the time-division multiplex signal output from the first receiving means (8) and the time-division multiplex signal output from the second receiving means (9) while the time-division multiplex signals remain multiplexed, as seen from FIG. 1.

In order for one of the channel signals to be selected while the signals remain multiplexed, the channel signals must be in phase. The phase matching means (3, 4) are provided to cope with the situation where the channel signals are out of phase.

Further, to enable the path protection switching device to operate with time-division multiplex signals in which channel signals of difference sizes are multiplexed, each of the signal size detecting means (5, 6) detects the size of the individual channel signals forming the multiplex signal input via the corresponding path, based on the information contained in the multiplex signal, and supplies the detected signal size to the path switch 12. Based on the input signal sizes, the path switch 12 selects one of the channel signals.

Furthermore, based on the signal sizes supplied from the signal size detecting means (5, 6), each of the first and second alarm detecting means (10, 11) detects alarm information contained in the time-division multiplex signal in which channel signals of different sizes are multiplexed, according to time-division control.

Thus, the path switch 12 and the first and second alarm detecting means (10, 11) individually operate according to channel-based time-division control, making it possible to reduce the scale of the circuitry.

The embodiment of the present invention will be now described in detail.

FIG. 1 is a block diagram schematically illustrating a transmitter-receiver according to the present invention. The figure illustrates only a drop signal processing section.

A multiplex signal dealt with by the transmitter-receiver will be described first prior to the explanation of the transmitter-receiver. The transmitter-receiver is designed to transmit and receive a multiplex signal which is obtained by multiplexing a plurality of VT signals of different signal sizes and mapping the resulting signal in a SONET STS-1 frame.

Figure 2:
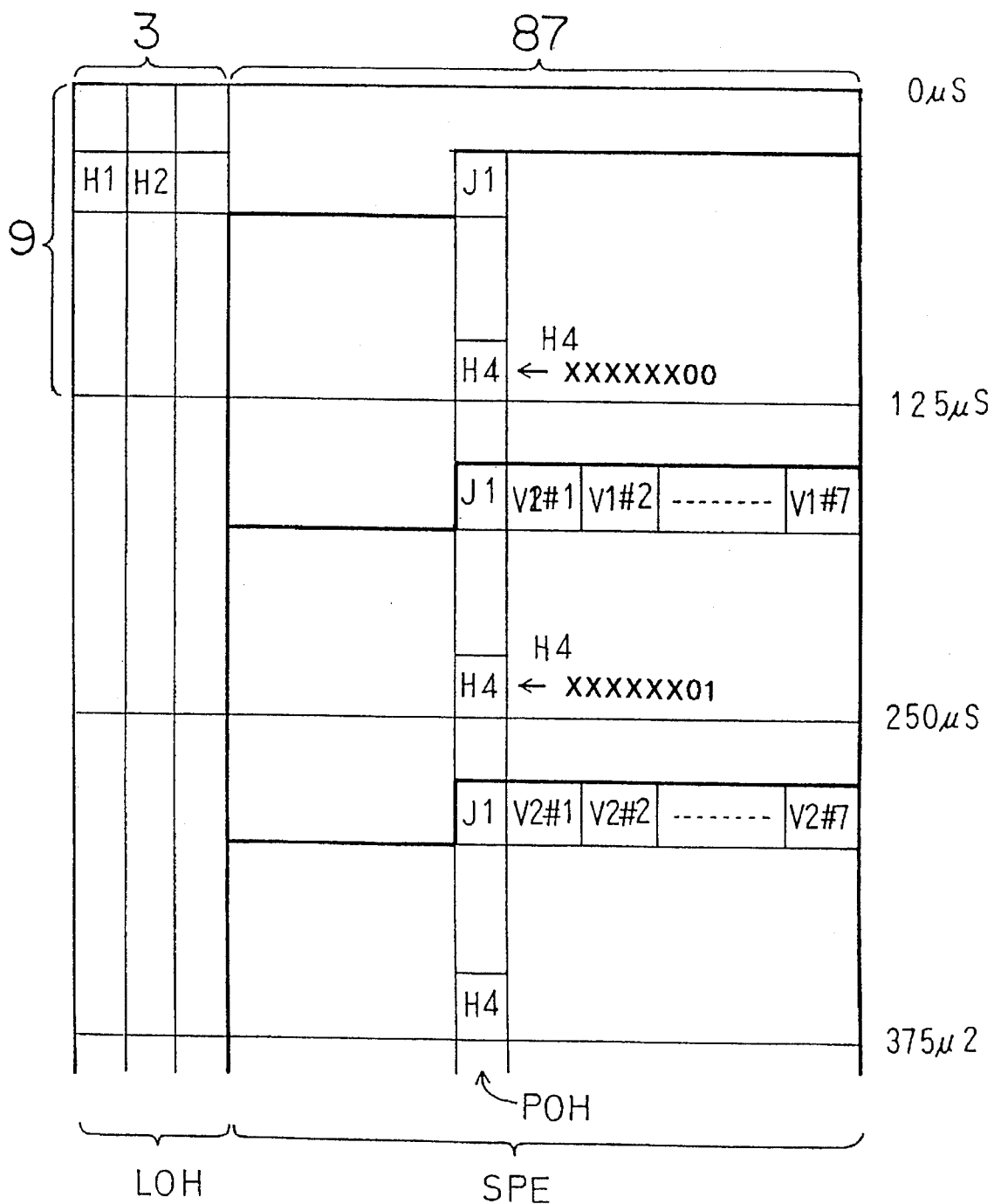
FIG. 2 is a diagram showing an STS-1 frame format.

FIG. 2 illustrates the STS-1 frame format. As illustrated, one frame consists of 810 bytes of 90 columns by 9 rows, wherein 3 columns by 9 rows are allotted to LOH (Line OverHead) and 87 columns by 9 rows are allotted to SPE (Synchronous Payload Envelope). In the SPE, 1 column by 9 rows is allotted to POH (Path OverHead). The transmission time of one frame is 125 ms, and the frame is transmitted from the left to right column and from the upper to lower row. The SPE has a transmission capacity of 50.112 Mb/s.

In the SPE, a plurality of VT signals are multiplexed and mapped. The VT signal is a signal which is to be supplied to a low-order transmit-receive unit of a corresponding channel. The VT signals are classified into four types: VT1.5 (1.728 Mb/s), VT2 (2.304 Mb/s), VT3 (3.456 Mb/s) and VT6 (6.912 Mb/s). Four VT1.5 signals, three VT2 signals, two VT3 signals, and one VT6 signal individually form a group (VTG), and seven such VTGs are mapped in one SPE. Accordingly, signals corresponding to 28 channels at maximum are mapped in one frame. Each VTG consists of VT signals of the same type, but the VT signals within the seven VTGs can be of different types.

H1 and H2 bytes in the LOH retain pointer information which represents the position of J1 byte in the POH, i.e., the beginning of the SPE. H4 byte in the POH is separated a predetermined number of bytes from the J1 byte. The H4 byte stores a signal indicating the type of overhead information stored in the subsequent frame. For example, if two low-order bits of the signal are "00", it means that V1 overhead information of the seven VTGs is stored at a storage location following the J1 byte of the subsequent frame, and if the two low-order bits of the signal are "01" then it means that V2 overhead information of the seven VTGs is stored at the storage location following the J1 byte of the subsequent frame.

Figure 3:
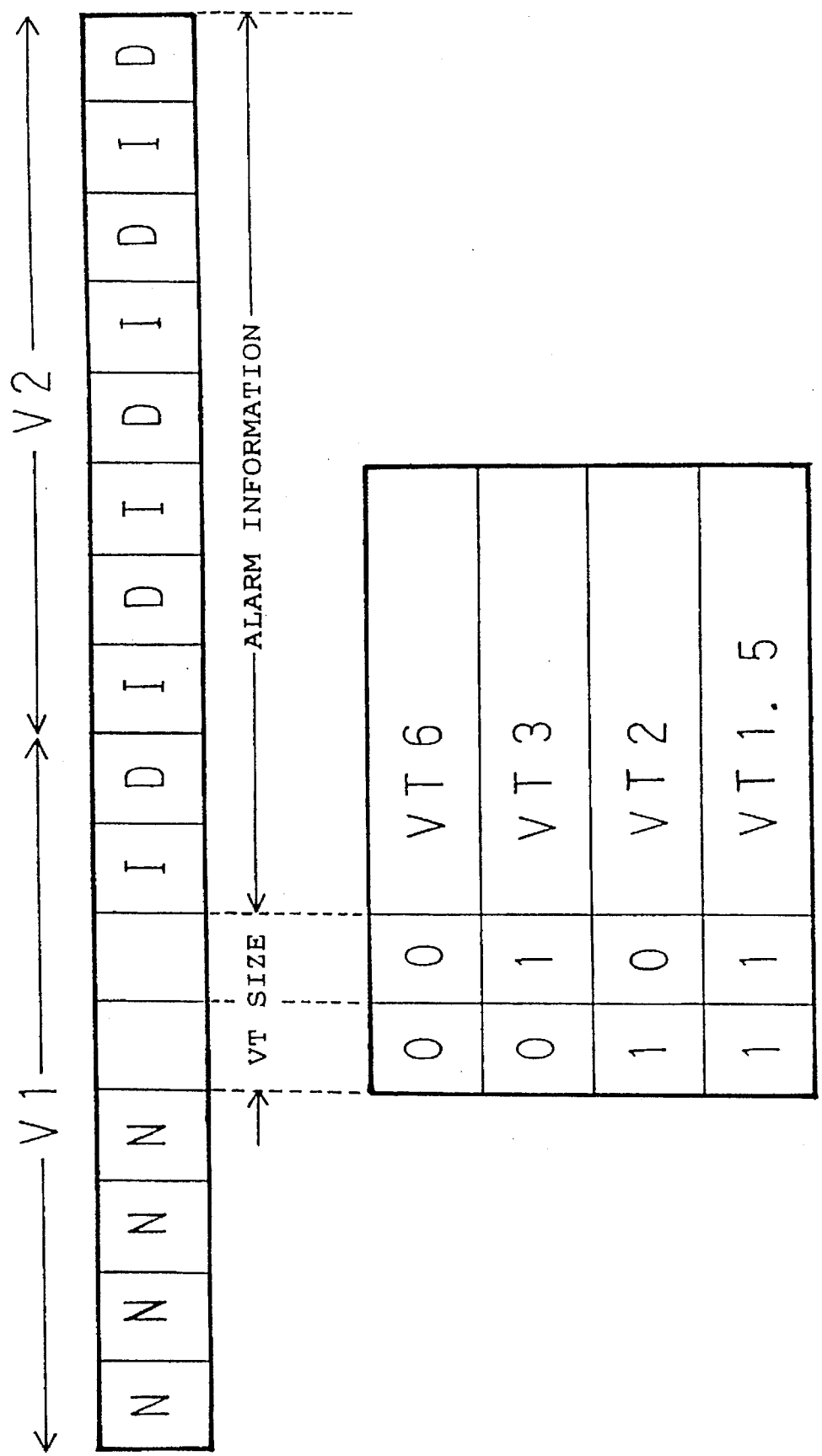
FIG. 3 is a diagram illustrating the contents of overhead information stored in V1 and V2 bytes.
Figure 4A:
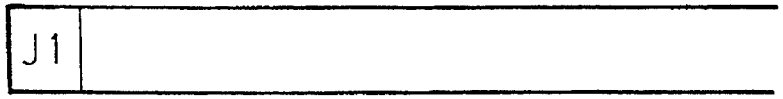
FIG. 4 is a diagram illustrating the operation of a phase adjusting section.
Figure 4B:
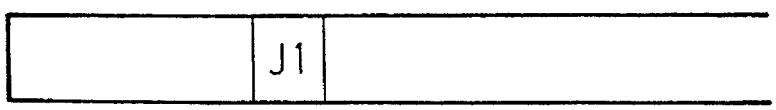
Figure 4C:
Figure 4D:
Figure 4E:
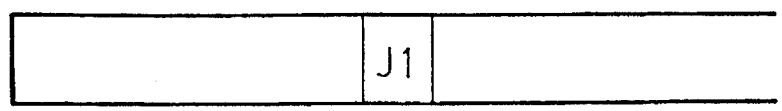
Figure 4F:

FIG. 3 illustrates the contents of the overhead information stored in V1 and V2 bytes. As illustrated, the fifth and sixth bits in the V1 byte retain information (VT size information) on the type of VT signals forming the corresponding VTG, and the seventh and eighth bits in the V1 byte and the first to eighth bits of the V2 byte retain alarm information of the VT signals forming the corresponding VTG.

Referring again to FIG. 1, O/E modules 1 and 2 convert optical signals transmitted thereto via current and reserve lines to electrical signals, and supply the converted electrical signals to phase adjusting sections 3 and 4, respectively. The phase adjusting sections 3 and 4 each adjust the J1 byte position in the SPE of the corresponding multiplex signal in accordance with a master timing pulse and master clock pulses supplied from a master clock 7, such that the J1 byte positions in the SPEs of the multiplex signals from the current and reserve lines finally coincide with each other, as shown in FIG. 4. Outputs of the phase adjusting sections 3 and 4 are supplied to VT size detecting sections 5 and 6, respectively. The VT size detecting sections 5 and 6 detect the signal sizes (VT sizes) of the VT signals mapped in the respective multiplex signals, based on the master timing pulse and master clock pulses from the master clock 7, and supply the detected VT sizes to respective TSAs 8 and 9, respective alarm detecting sections 10 and 11, and a path switch 12. The arrangement of the phase adjusting sections 3 and 4 will be described in detail later with reference to FIG. 5.

Based on the VT sizes, the TSA 8 separates the multiplex signal supplied thereto from the phase adjusting section 3 via the VT size detecting section 5 to extract drop channel signals, and subjects the drop channel signals again to time-division multiplexing, the multiplexed signal being output to the path switch 12 and the alarm detecting section 10. The TSA 9 carries out an operation similar to that executed by the TSA 8.

The alarm detecting section 10 performs channel-by-channel alarm detection on the multiplexed drop channel signal, based on the VT sizes supplied thereto, and supplies alarm information of the individual channels to the path switch 12. Namely, the alarm detecting section 10 carries out the alarm detection on the multiplexed signal itself, and not on signals separated according to the channels, in accordance with time-division control. The alarm detecting section 11 carries out an operation similar to that executed by the alarm detecting section 10. The arrangement of the alarm detecting sections 10 and 11 will be described in detail later with reference to FIGS. 6 and 8.

Based on the VT sizes and the alarm information of the individual channels, the path switch 12 carries out a path switching operation on a channel-by-channel basis with respect to the two multiplexed drop channel signals supplied from the TSAs 8 and 9, and outputs a multiplex signal consisting only of channel signals of excellent line quality. Namely, the path switch 12 performs the path switching operation on the multiplexed signals themselves, and not on signals separated according to the channels, in accordance with time-division control. The arrangement of the path switch 12 will be described in detail later with reference to FIG. 10.

The master clock 7 used is an independent oscillator in the transmitter-receiver, and not a line clock, whereby interruption of services due to line fault can be prevented.

Thus, the single path switch 12 performs a path switching operation according to the time-division control, and the two alarm detecting sections 10 and 11 associated with the current and reserve lines each perform alarm detection according to the time-division control, whereby a transmitter-receiver of which the scale of circuitry is independent of the number of channels can be provided. To achieve the time-division operation, however, the multiplex signals from the current and reserve lines must be in phase, and the necessary phase adjustment is accomplished by the phase adjusting sections 3 and 4. Specifically, pointer values indicating the phase positions of the respective multiplex signals on the current and reserve lines are remapped and modified at intermediate nodes (ADM transmitters-receivers) connected to the lines, and thus the pointer values are not always equal to each other. Accordingly, the phase adjusting sections 3 and 4 match the phases by means of the master clock 7. Further, since signals of different sizes are multiplexed, it is necessary that the time-division control be executed in accordance with the signal sizes. To this end, the VT size detecting sections 5 and 6 detect the signal sizes and supply the detected signal sizes to the path switch 12, the alarm detecting sections 10 and 11, etc.

The arrangements of the phase adjusting sections, alarm detecting sections, and path switch will be now explained in detail.

Figure 5:
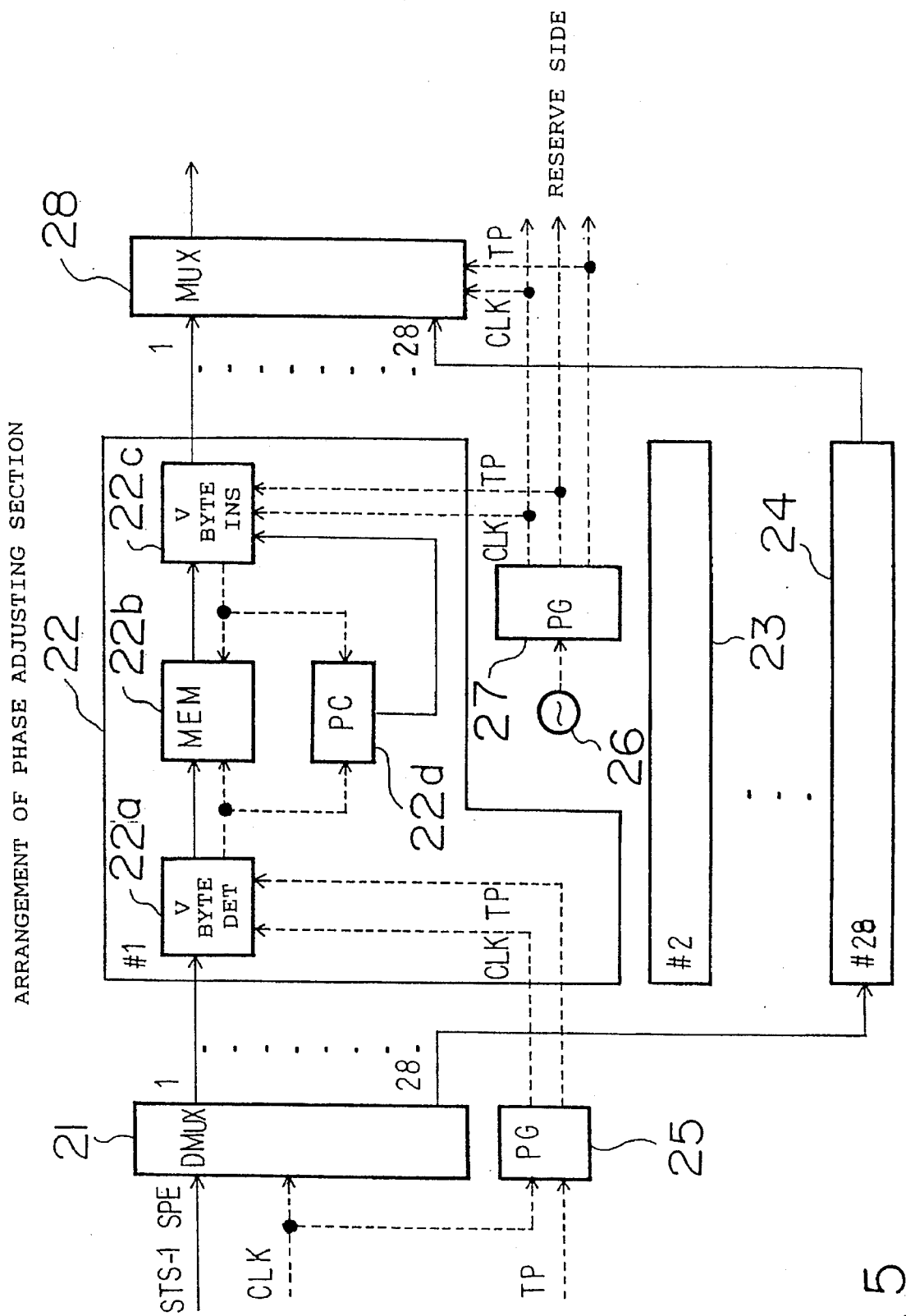
FIG. 5 is a block diagram showing the arrangement of the phase adjusting section.

FIG. 5 is a block diagram showing the arrangement of the phase adjusting section. Since the SPE of an STS-1 frame can retain VT signals corresponding to 28 channels at maximum, a DMUX 21 separates the data in the SPE into 28 channels and outputs the separated data i tems to respective processing sections 22–24 associated with the 28 channels (#1–#28). The processing sections 22–24 have an identical arrangement; therefore, only one of them will be explained below. On receiving a line timing pulse (TP) indicating the start timing of the STS-1 frame and line clock pulses (CLK), a pulse generator (PG) 25 outputs timing pulses (TP), which indicate the heads of VT signals of the respective channels, and line clock pulses (CLK) to the respective processing sections 22–24.

Based on the timing pulse (TP) and the line clock pulse (CLK), a V byte DET 22a extracts only genuine data from the corresponding VT signal and outputs the extracted data to a memory section (MEM) 22b.

The memory section 22b stores only the genuine data contained in the VT signal. A V byte INS 22c is supplied with a clock pulse (CLK) and a timing signal (TP) which are generated by the pulse generator 25 in accordance with signals from the master clock 7, and reads out the VT signal from the memory section 22b in synchronism with the signals supplied thereto. A phase comparing section (PC) 22d detects a phase difference between the write timing and read timing of the memory section 22b, and outputs the detected phase difference to the V byte INS 22c. Based on the phase difference, the V byte INS 22c reattaches a pointer to the VT signal read from the memory section 22b, and outputs the resulting signal to an MUX 28. The MUX 28 subjects the 28-channel VT signals, which are supplied synchronously from the respective processing sections 22–24 and to each of which the pointer has been reattached, to time-division multiplexing, and outputs the thus-multiplexed signal. The clock signal and timing signal from the pulse generator 27 are supplied not only to the MUX 28 but also to the reserve-side processing sections (assuming that the processing section 22 is on the current side). Accordingly, the V byte INS and MUX of the reserve side operate in accordance with the same clock and timing signals as used at the current side, whereby the current-side VT signal and the reserve-side VT signal are finally adjusted to be in phase (synchronized).

Although the above processing sections 22–24 are operated synchronously by means of the master clock 26, the processing sections of the current and reserve sides may be designed to operate in synchronism with the line clock pulse and line timing pulse of the current side. In this case, the memory section, V byte INS and phase difference detecting section for the phase adjustment can be omitted from the current-side processing sections.

Figure 6:
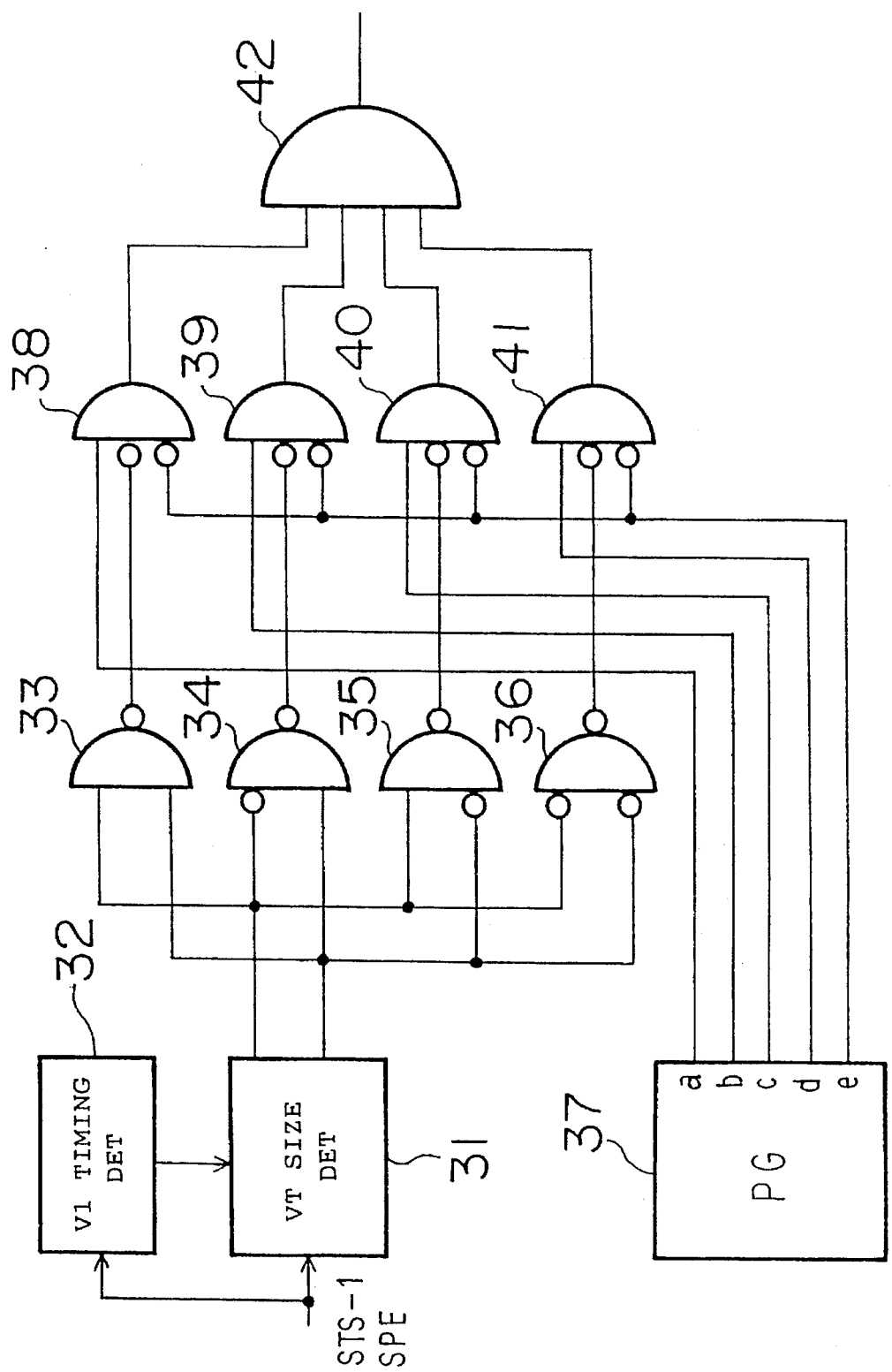
FIG. 6 is a block diagram of a detection pulse generating circuit in an alarm detecting section.
Figure 7:
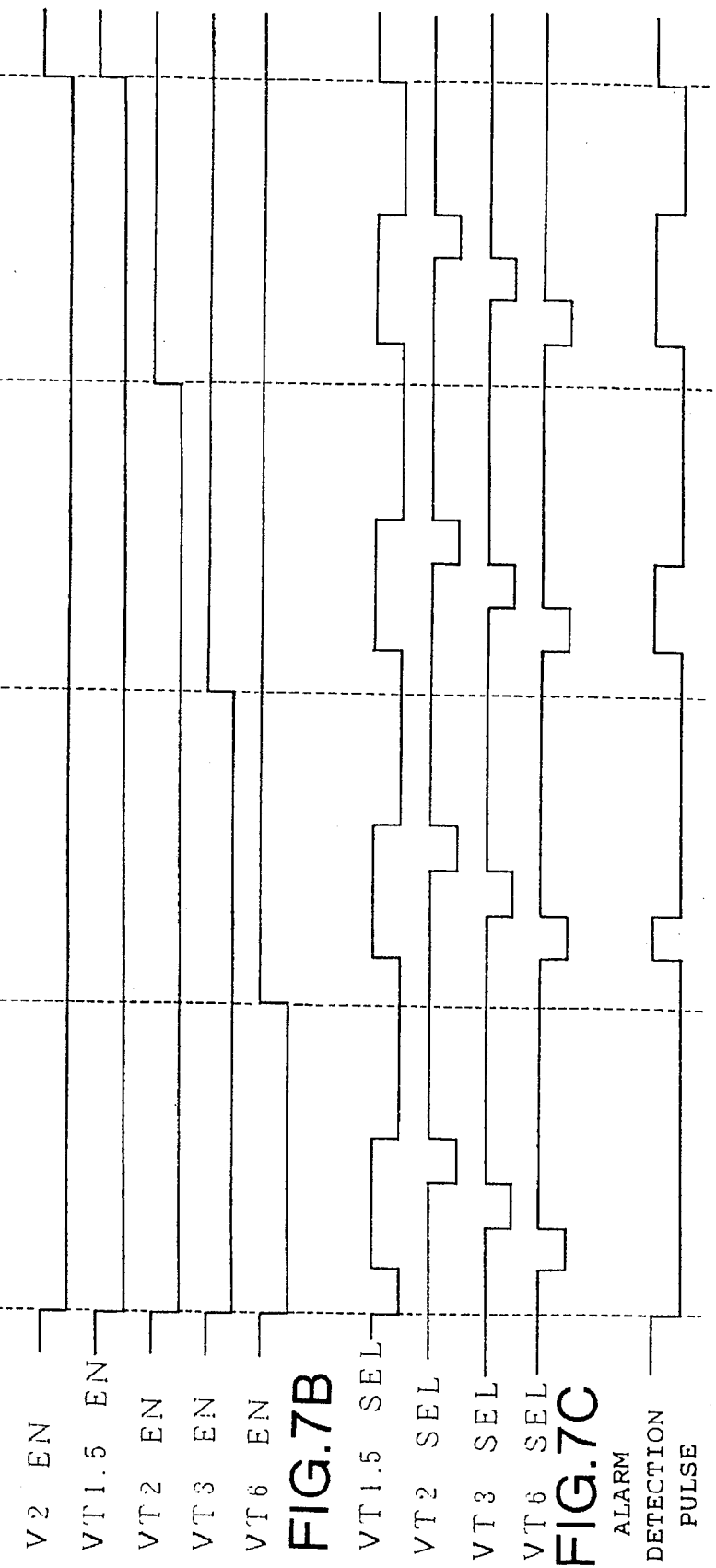
FIG. 7 is a timing chart showing waveforms of signals at various points in the detection pulse generating circuit.

FIG. 6 is a block diagram of a detection pulse generating circuit in the alarm detecting section. The detection pulse generating circuit serves to detect an alarm signal (Path AIS; Path Alarm Indication Signal), which indicates path abnormality and which is contained in each of VT signals of different sizes mapped in the multiplex signal, while the multiplex signal remains multiplexed, i.e., without separating the multiplex signal according to the channels, and to generate a detection pulse serving as a gating signal at a position where the alarm signal is inserted. In practice, however, the detection pulse signal serves to mask portions of the multiplex signal where no alarm signal is inserted, as described below. FIG. 7 is a timing chart showing waveforms of signals at various points in the detection pulse generating circuit. Referring also to FIG. 7, the detection pulse generating circuit of FIG. 6 will be explained.

In FIG. 6, a VT size DET 31 and a V1 timing DET 32 correspond to the VT size detecting sections 5 and 6 in FIG. 1. The V1 timing DET 32 detects an input timing signal indicating the storage location of V1 byte in which the VT size is stored, and outputs a timing signal to the VT size DET 31. The VT size DET 31 reads out the VT size from the V1 byte in accordance with the timing signal supplied thereto, and outputs a 2-bit signal. As shown in the row "VT SIZE" in FIG. 7, the VT size DET 31 outputs, for example, "11", "00", "01", "10", . . . as the VT sizes. These VT sizes indicate that VT1.5 signals, VT6 signals, VT3 signals, and VT2 signals are respectively mapped, as seen from FIG. 3.

The signals from the VT size DET 31 are supplied to four NAND circuits 33 to 36. Consequently, the NAND circuits 33 to 36 output pulses indicated respectively at "VT1.5 SEL", "VT2 SEL", "VT3 SEL" and "VT6 SEL" in FIG. 7. Namely, the NAND circuits 33 to 36 each output the pulse "0" when supplied with a VT signal corresponding thereto.

In accordance with the input timing of the J1 byte, a pulse generator (PG) 37 outputs pulses indicated respectively at "VT1.5 EN", "VT2 EN", "VT3 EN", "VT6 EN" and "V2 EN" in FIG. 7. V2 EN is a pulse indicating a time period in which the alarm signal can exist without regard to the type of VT signal. VT1.5 EN, VT2 EN, VT3 EN and VT6 EN are each a pulse indicating a time period in which the alarm signal can exist with regard to the corresponding VT signal. For example, since one VTG contains four VT1.5 signals (VT signals), alarm detection must be effected at the beginning of each of the four VT signals, and thus the VT1.5 EN pulse as shown in FIG. 7 is output. On the other hand, one VTG contains a single VT6 signal as the VT signal; therefore, alarm detection is effected at the beginning of the single VT6 signal by means of the VT6 EN pulse as illustrated. The subsequent portion of the VT6 signal is genuine data (indicated by symbol "I" (information) in the row "VT SIZE in FIG. 7) and contains no alarm signal, and therefore, VT6 EN turns to high level.

The outputs VT1.5 SEL, VT2 SEL, VT3 SEL and VT6 SEL of the NAND circuits 33 to 36 and the outputs VT1.5 EN, VT2 EN, VT3 EN, VT6 EN and V2 EN of the pulse generator 37 are supplied to respective AND circuits 38 to 41. The outputs of the AND circuits 38 to 41 are supplied to an AND circuit 42. Consequently, the AND circuit 42 outputs a signal as indicated in the row "ALARM DETECTION PULSE" in FIG. 7. Namely, the output signal of the AND circuit 42 turns to high level "1" during a time period corresponding to the input of genuine data of the VT signals, indicated by symbol "I". Using this pulse signal, VT signal intervals in which no alarm signal exists are masked to prohibit alarm detection, and only the signal intervals in which the alarm signal exists are subjected to the alarm detection process.

Figure 8:
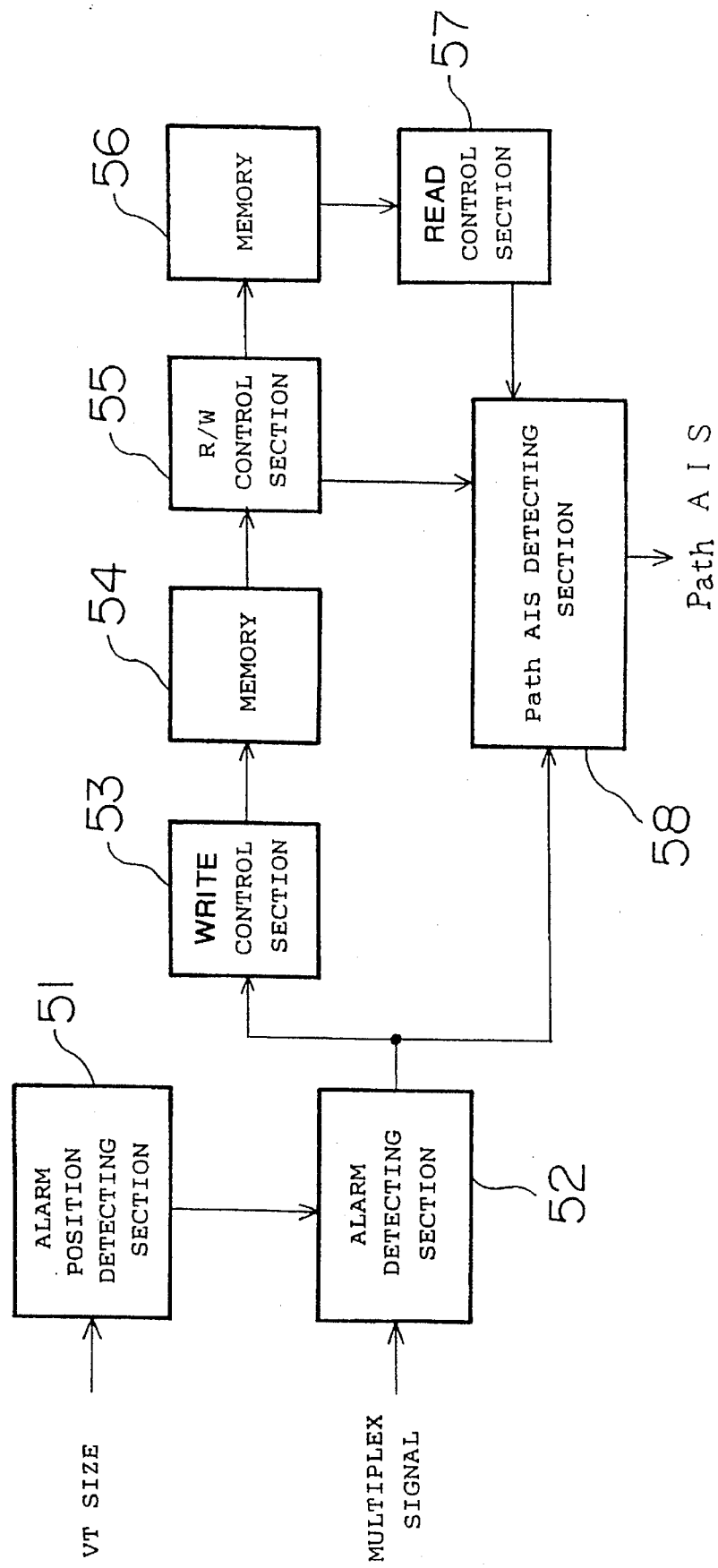
FIG. 8 is a block diagram of a Path AIS detection circuit in the alarm detecting section.
Figure 9:
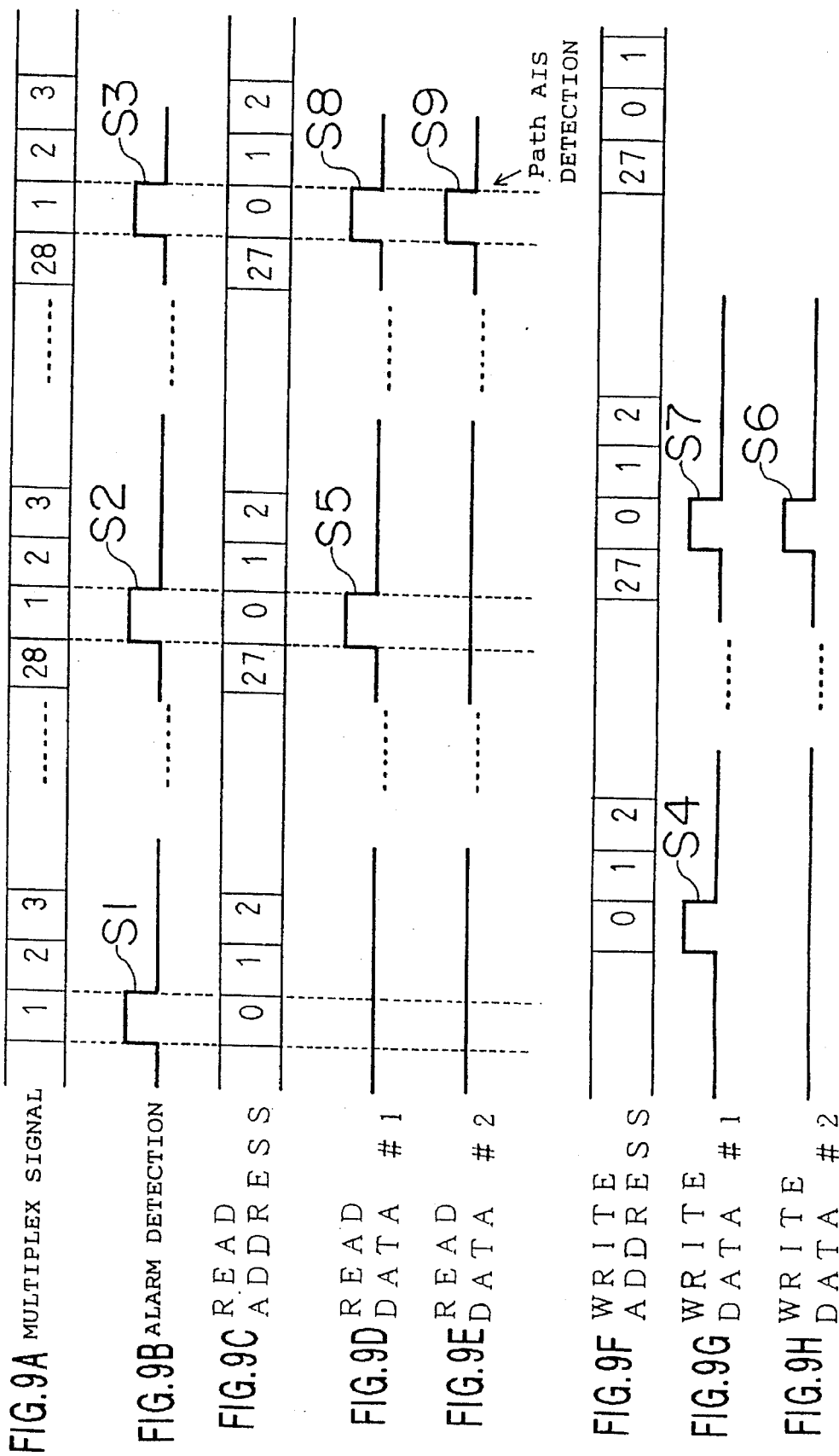
FIG. 9 is a timing chart showing waveforms of signals at various points in the Path AIS detection circuit.

FIG. 8 is a block diagram of a Path AIS detection circuit in the alarm detecting section. The Path AIS detection circuit is provided for accurately detecting a line fault on a channel-by-channel basis without being affected by noise or the like, and outputs a Path AIS signal upon detecting three consecutive occurrences of alarm. FIG. 9 is a timing chart showing waveforms of signals at various points in the Path AIS detection circuit. Referring also to FIG. 9, the Path AIS detection circuit of FIG. 8 will be explained.

In FIG. 8, an alarm position detecting section 51, which is supplied with the VT sizes, detects the position (timing) of the alarm signal for each of the channels and supplies a detection signal to an alarm detecting section 52. The position of the alarm signal corresponds to the seventh and eighth bits in the V1 byte and the first to eighth bits of the V2 byte shown in FIG. 3. The alarm detecting section 52 extracts the alarm signal of each channel from the corresponding portion of the time-division multiplex signal supplied thereto. Specifically, provided an alarm exists in the signal associated with channel 1, for example, among the 28 channels and the alarm is detected three consecutive times (S1, S2, S3) as shown in the row "MULTIPLEX SIGNAL" in FIG. 9, these alarms are successively detected by the alarm detecting section 52. The alarm signal is identified when the seventh and eighth bits in the V1 byte and the first to eighth bits of the V2 byte are all "1".

A write control section 53 is provided for writing the detected alarm signals into a memory 54 according to the respective channels. The memory 54 is capable of storing alarms corresponding to the 28 channels. Specifically, the write control section 53 writes the alarm signal S1 into the memory 54 at address "0" corresponding to the channel 1, as shown in the rows "WRITE ADDRESS" and "WRITE DATA #1" in FIG. 9. The written data is indicated at S4.

An R/W control section 55 is a read/write control section which reads out the alarm data of the individual channels from the memory 54 to be output to a Path AIS detecting section 58 and which also writes the read alarm data into a memory 56 according to the respective channels. The memory 56 is capable of storing alarms corresponding to the 28 channels. Specifically, when the alarm signal S2 is detected in the channel 1, the R/W control section 55 first reads out the alarm data S4 from the address "0" of the memory 54 and outputs the read data to the Path AIS detecting section 58 as alarm data S5, as shown in the rows "READ ADDRESS" and "READ DATA #1" in FIG. 9. Then, as shown in the rows "WRITE ADDRESS" and "WRITE DATA #2" in FIG. 9, the R/W control section 55 writes the alarm data S5 into the memory 56 at the address "0" corresponding to the channel 1. The written data is indicated at S6. At this time, the write control section 53 writes the alarm signal S2 into the memory 54 at the address "0" corresponding to the channel 1, as shown in the rows "WRITE ADDRESS" and "WRITE DATA #1" in FIG. 9, the written data being indicated at S7.

A read control section 57 is provided for reading the alarm signals from the memory 56 according to the respective channels and outputting the read signals to the Path AIS detecting section 58. Specifically, when the alarm signal S3 of the channel 1 is detected, the read control section 57 reads the alarm data S6 from the address "0" of the memory 56 and outputs the read data to the Path AIS detecting section 58 as alarm data S9, as shown in the rows "READ ADDRESS" and "READ DATA #2" in FIG. 9. Simultaneously, the R/W control section 55 reads the alarm data S7 from the address "0" of the memory 54 and outputs the read data to the Path AIS detecting section 58 as alarm data S8. The Path AIS detecting section 58 is also supplied with the alarm signals S1 to S3 from the alarm detecting section 52. The Path AIS detecting section 58 comprises an AND circuit. Accordingly, on receiving the alarm signal S3 from the alarm detecting section 52, the alarm data S8 from the R/W control section 55, and the alarm data S9 from the read control section 57, the Path AIS detecting section 58 outputs a Path AIS signal. At the point of time when the alarm signal S1 or S2 is input, the Path AIS detecting section 58 is not yet supplied with signals corresponding to the alarm data S8 and S9; therefore, it does not output the Path AIS signal. Namely, the Path AIS signal is output only when an alarm signal is detected three consecutive times in any of the channels.

Since the detection pulse generating circuit and the Path AIS detection circuit are provided as described above, the alarm detecting sections of the current and reserve sides each can perform the alarm detection of the individual channels on the multiplexed drop channel signals, based on the VT sizes supplied thereto, and supply the alarm information of the individual channels to the path switch 12.

Figure 10:
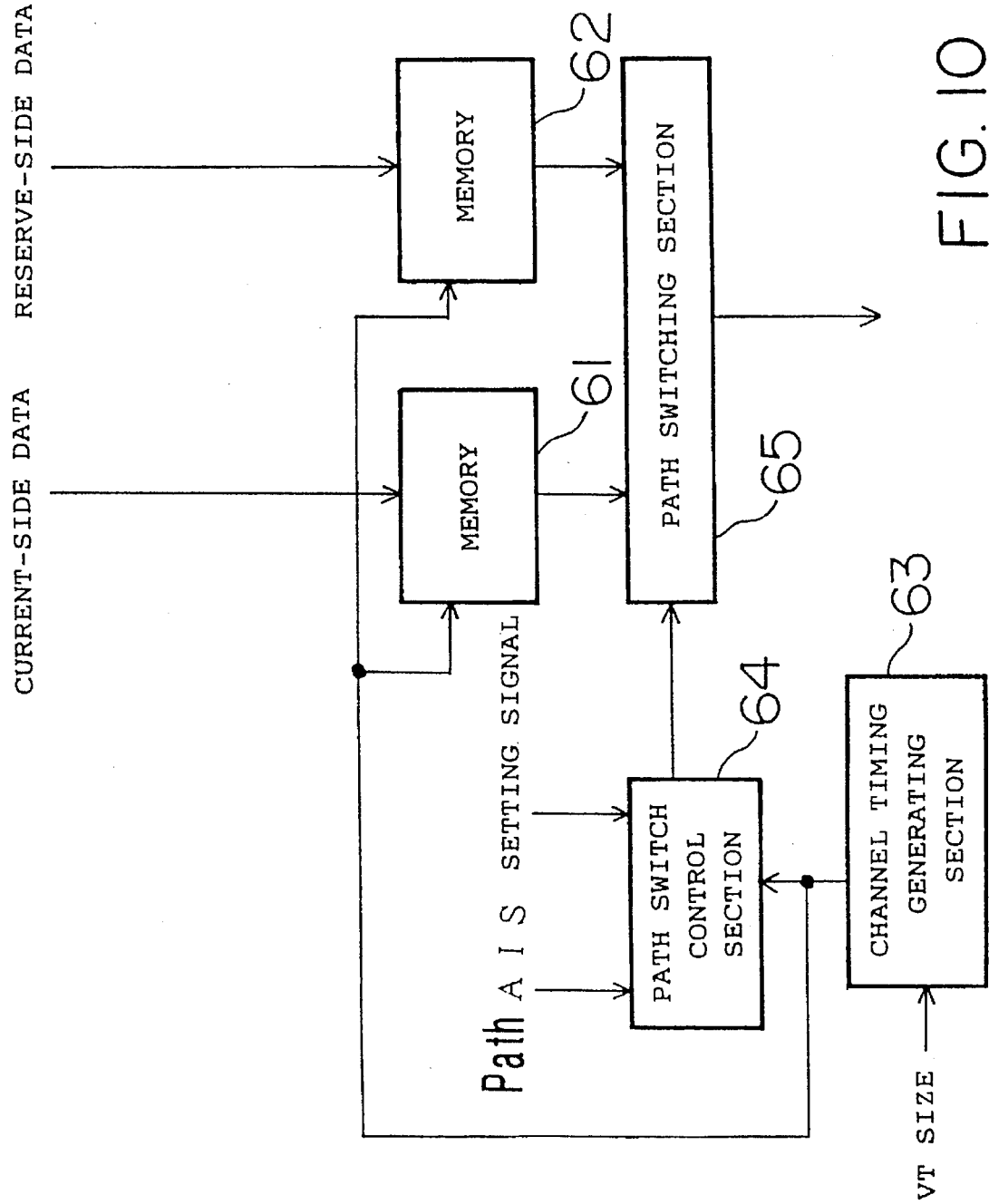
FIG. 10 is a diagram showing the internal arrangement of a path switch.

FIG. 10 illustrates the internal arrangement of the path switch. Although the phase adjusting sections 3 and 4 in FIG. 1 adjust the multiplex signals of the current and reserve sides to be in phase, the current- and reserve-side multiplex signals are subject to a slight bit phase difference due to variation in the performances of the constituent elements interposed between the phase adjusting section and the path switch 12. The path switch shown in FIG. 10 absorbs such phase difference and carries out a path switching operation according to time-division control while the multiplex signals remain multiplexed.

In FIG. 10, memories 61 and 62 store the multiplex signals of the current and reserve sides, respectively. A channel timing generating section 63 is supplied with the VT sizes. Based on the VT sizes, the channel timing generating section 63 generates timing signals for the respective channels, and supplies the timing signals to a path switch control section 64, as well as to the memories 61 and 62 as read timing signals. The path switch control section 64 is also supplied with the Path AIS signals of the individual channels from the alarm detecting sections 10 and 11 in FIG. 1, as well as a path setting signal from a control device. The path setting signal is generated by the control device when the setting of the path switch is to be changed in accordance with various conditions. Based on the Path AIS signals of the individual channels and the path setting signal, the path switch control section 64 selects the current- or reserve- side channel signal, and outputs a control signal to a path switching section 65 in synchronism with the channel timing signal from the channel timing generating section 63. On the other hand, the memories 61 and 62 output the current- and reserve-side multiplex signals respectively stored therein to the path switching section 65 in accordance with the read timing signal from the channel timing generating section 63. The operation carried out at this time by the path switching section 65 will be explained with reference to FIG. 11.

Figure 11:
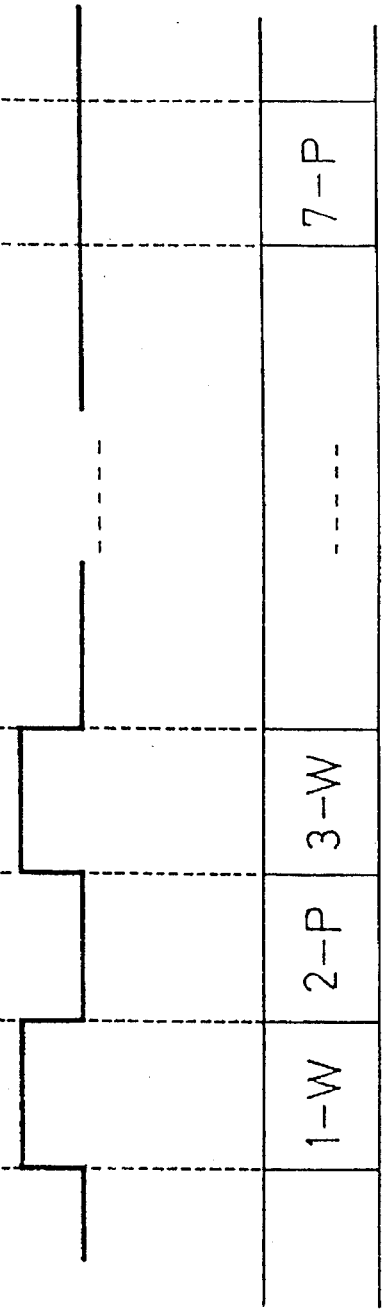
FIG. 11 is a diagram illustrating a switching operation of a path switching section.

FIG. 11 illustrates the switching operation of the path switching section 65. In the figure, "1-W", "2-W", . . . represent current-side signals of respective channels, and "1-P", "2-P", . . . represent reserve-side signals of respective channels.

For example, when a control signal as shown in the row "CONTROL SIGNAL" in FIG. 11 is output from the path switch control section 64 to the path switching section 65, the path switching section 65 performs a switching operation in accordance with the control signal, and outputs a signal as shown in the row "PATH SWITCH OUTPUT".

Consequently, based on the VT sizes and the alarm information of the individual channels, the path switch performs a path switching for each channel on the two multiplex drop channel signals, and outputs a multiplex signal consisting only of channel signals of excellent line quality.

Figure 12:
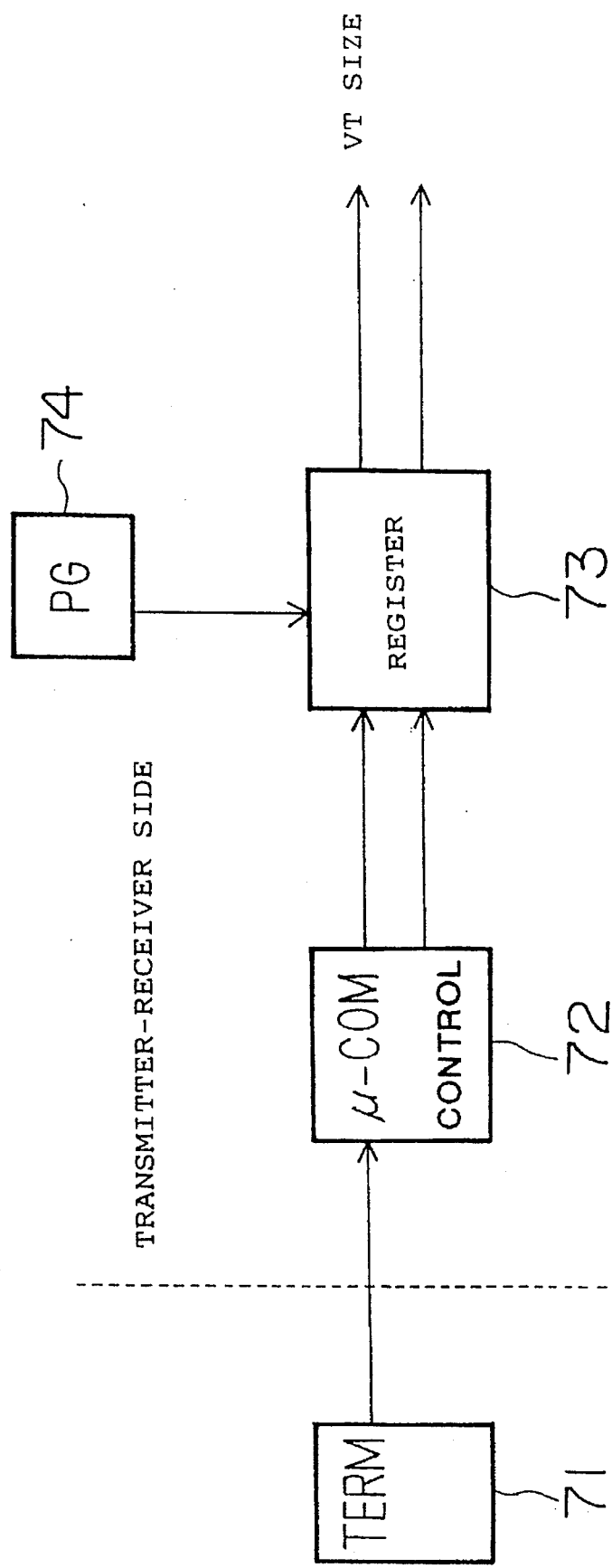
FIG. 12 is a block diagram showing the configuration of a transmitter-receiver adapted for external setting.
Figure 13:
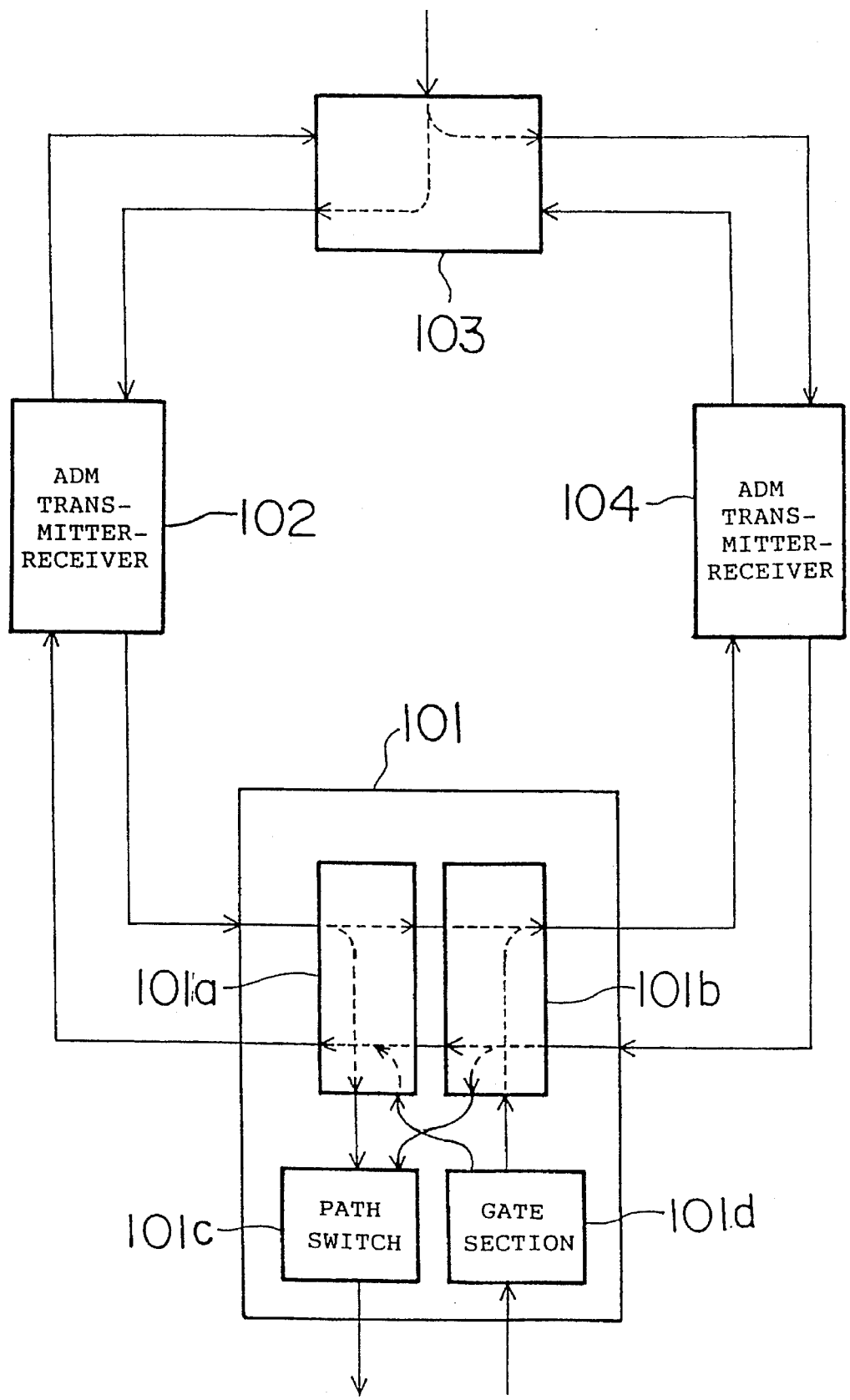
FIG. 13 is a diagram showing a SONET type ring network.
Figure 14:
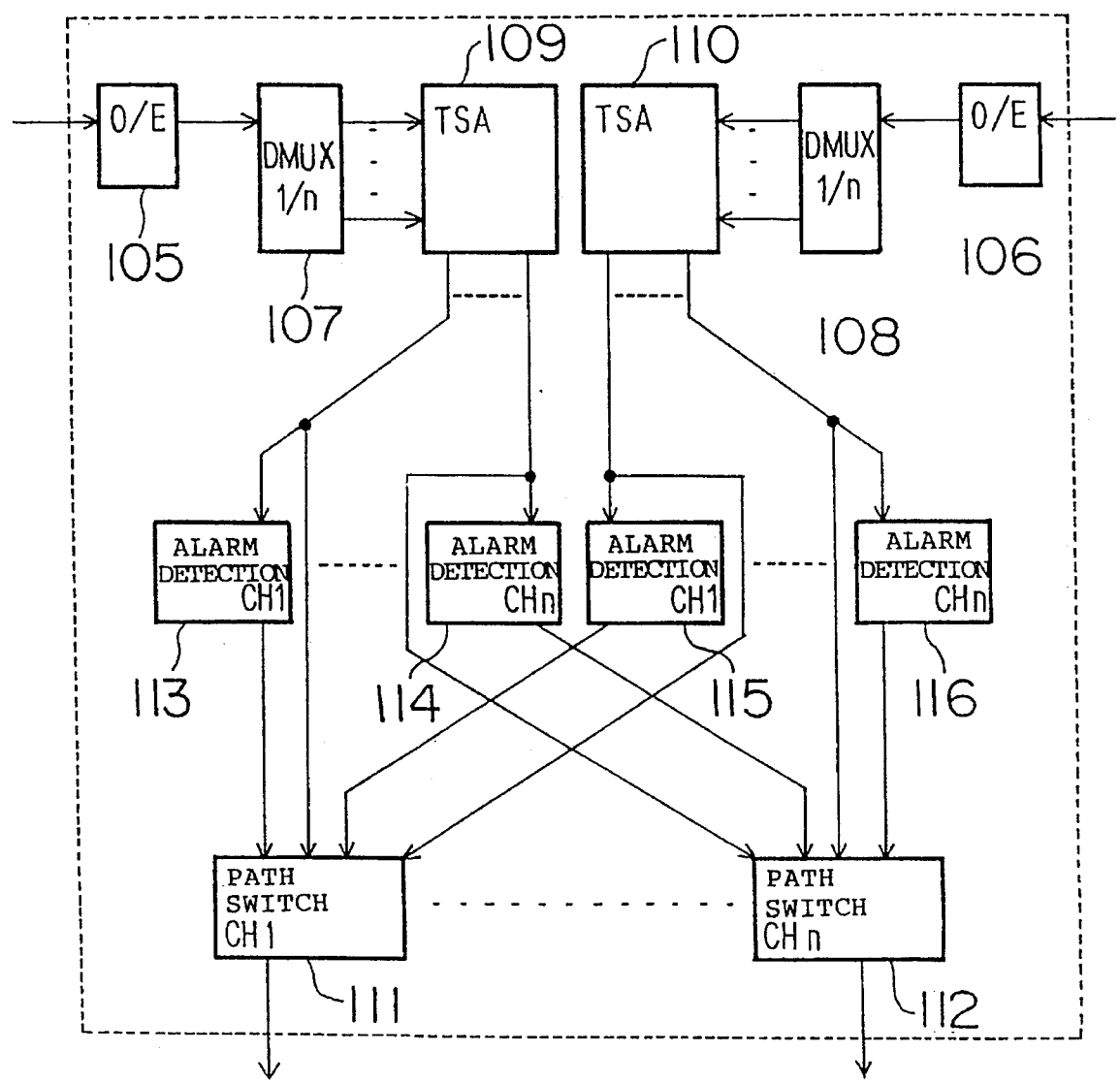
FIG. 14 is a block diagram showing the internal arrangement of a conventional transmitter-receiver employing PPSR.

FIG. 12 is a block diagram showing a system configuration wherein the VT size is not contained in the multiplex signal but is set externally. Specifically, the VT sizes VTG#1 to VTG#7 are set by an external terminal (TERM) 71 and supplied to a control device (μ-COM) 72 arranged within the transmitter-receiver. The control device 72 supplies a 2-bit signal corresponding to the VT size to a register 73. A pulse generator (PG) 74 outputs a pulse signal to the register 73 in accordance with timing at which the VT size of each channel is to be output, and the register 73 outputs a 2-bit signal, which corresponds to the output of the VT size DET 31 in FIG. 6, to the NAND circuits 33 to 36.

Thus, the present invention can be applied to a transmitter-receiver for transmitting and receiving multiplex signals wherein VT sizes are fixed in time and are not transmitted bymeans of the V1 byte.

As described above, according to the present invention, the path switch and the current- and reserve-side alarm detecting means each operate according to channel-based time-division control; therefore, only three elements, i.e., one path switch and current- and reserve-side alarm detecting means, suffice without regard to the number of channels associated with low-order transmit-receive units. Accordingly, the circuitry can be reduced in scale, thus making it possible to reduce the cost of products, power consumption, capacity of the devices, etc.

In cases where extra data need be added to the contents of alarm detection due to a change of the PPSR specifications, for example, it is not necessary to enlarge the scale of circuitry, making it possible to reduce the cost of products, power consumption, capacity of the devices, etc.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A path protection switching device for a SONET type transmitter-receiver for transmitting and receiving a synchronous byte multiplex signal obtained by multiplexing a plurality of VT signals and mapping a resulting multiplexer signal in a SONET STS-1 frame, the device comprising:

first receiving means for extracting from multiplex signals supplied thereto via one path, only first channel signals directed to a plurality of channels belonging to the transmitter-receiver associated with the device, and subjecting the extracted first channel signals to time-division multiplexing to obtain a first time-division multiplex signal;

second receiving means for extracting from multiplex signals supplied thereto via another path only second channel signals directed to said channels, and subjecting the extracted second channel signals to time-division multiplexing to obtain a second time-division multiplex signal; and a path switch, coupled to said first receiving means and said second receiving means, for selecting one of the first and second channel signals supplied thereto at identical timing, from the first and second time-division multiplex signals output from said first and second receiving means while the first and second time-division multiplex signals remain multiplexed.

2. The path protection switching device according to claim 1, further comprising first and second phase matching means for causing the first and second multiplex signals input via said one path and said another path, respectively, to be in phase by means of a master clock supplied to said first and second phase matching means.

3. The path protection switching device according to claim 1, further comprising first and second phase matching means arranged immediately before said path switch, for causing the first and second time-division multiplex signals output from said first and second receiving means, respectively, to be in phase.

4. The path protection switching device according to claim 1, further comprising signal size detecting means for detecting a signal size of each of the channel signals forming the respective multiplex signal input via said one path or another path, based on information contained in the respective multiplex signal, and supplying the detected signal size to said path switch, and wherein, based on the signal size, said path switch selects one of the first and second channel signals supplied thereto at identical timing, from the first and second time-division multiplex signals in which channel signals of different sizes are multiplexed.

5. The path protection switching device according to claim 1, further comprising input means for permitting an external terminal to set a signal size of each of the channel signals forming the respective multiplex signal input via said one path or another path and supplying the set signal size to said path switch, and wherein, based on the signal size, said path switch selects one of the channel signals supplied thereto at identical timing, from the first and second time-division multiplex signals in which channel signals of different sizes are multiplexed.

6. The path protection switching device according to claim 1, further comprising first alarm detecting means for detecting alarm information contained in individual channel signals forming the first time-division multiplex signal from said first receiving means, and supplying the detected alarm information to said path switch, and second alarm detecting means for detecting alarm information contained in individual channel signals forming the second time-division multiplex signal from said second receiving means, and supplying the detected alarm information to said path switch.

7. The path protection switching device according to claim 6, further comprising signal size detecting means for detecting a signal size of each of the channel signals forming the respective multiplex signal input via said one path or another path, based on information contained in the respective multiplex signal, and supplying the detected signal size to said first and second alarm detecting means, and wherein, based on the signal size, each of said first and second alarm detecting means detects alarm information contained in the time-division multiplex signal in which channel signals of different sizes are multiplexed.

8. The path protection switching device according to claim 6, further comprising input means for permitting an external terminal to signal size of each of the channel signals forming the respective multiplex signal input via said one path or another path and supplying the specified signal size to said first and second alarm detecting means, and wherein, based on the signal size, each of said first and second alarm detecting means detects alarm information contained in the time-division multiplex signal in which channel signals of different sizes are multiplexed.

9. The path protection switching device according to claim 1, further comprising phase matching means for causing the respective multiplex signals input via said one path and said another path to be in phase by means of a line clock associated with said one path.

* * * * *